United States Patent [19]
Panis

[11] Patent Number: 5,726,713
[45] Date of Patent: Mar. 10, 1998

[54] METHOD OF COMPUTER ASSISTED MOTION ESTIMATION FOR PICTURE ELEMENTS OF CHRONOLOGICALLY SUCCESSIVE IMAGES OF A VIDEO SEQUENCE

[75] Inventor: Stathis Panis, Munich, Germany

[73] Assignee: Siemens Aktiengesellschaft, Munich, Germany

[21] Appl. No.: 771,041

[22] Filed: Dec. 20, 1996

[30] Foreign Application Priority Data

Dec. 22, 1995 [DE] Germany ............... 195 48 451.7

[51] Int. Cl.$^6$ ............... H04N 7/34; H04N 7/36
[52] U.S. Cl. ............... 348/413; 348/416; 348/699
[58] Field of Search ............... 348/396, 402, 348/407, 413, 416, 699; H04N 7/34, 7/36

[56] References Cited

U.S. PATENT DOCUMENTS

| | | | |
|---|---|---|---|
| 4,613,894 | 9/1986 | Catros | 348/407 |
| 4,668,986 | 5/1987 | Furukawa | 348/416 |
| 4,689,671 | 8/1987 | Ohki | 348/416 |
| 4,760,445 | 7/1988 | Mijiyawa | 348/699 |
| 4,853,775 | 8/1989 | Rouvrais | 348/699 |
| 5,089,887 | 2/1992 | Robert | 348/699 |
| 5,374,959 | 12/1994 | Sahakian | 348/451 |
| 5,392,072 | 2/1995 | Rodriguez | 348/405 |
| 5,500,689 | 3/1996 | Lam | 348/699 |
| 5,572,258 | 11/1996 | Yokoyama | 348/415 |

*Primary Examiner*—Howard W. Britton
*Attorney, Agent, or Firm*—Hill, Steadman & Simpson

[57] ABSTRACT

A motion estimation is implemented using a known dynamic programming method (DP method). A further dimension is thereby added to the optimization space of the DP algorithm. As a result thereof, the motion of objects is recognized in all directions and an incorrect classification of picture elements as occlusion, which could not be prevented in known methods, is thus avoided.

20 Claims, 4 Drawing Sheets

Image 2 Raster Line r

Image 2 Raster Line Segments

FIG 6b $(d_1\ d_2)$: Shift Vector (Disparity Vector)

FIG 7

METHOD OF COMPUTER ASSISTED MOTION ESTIMATION FOR PICTURE ELEMENTS OF CHRONOLOGICALLY SUCCESSIVE IMAGES OF A VIDEO SEQUENCE

BACKGROUND OF THE INVENTION

A qualitatively high-grade motion estimation for the blocks or, respectively, objects of the individual images of a video sequence is of critical significance in the field of block-based image coding methods or object based image coding methods as well in order to achieve a high quality of the reconstructed images at the receiver of the video data stream given an optimally high savings in required transmission capacity.

Instead of having to encode the luminance information and/or chrominance information of the individual picture elements (pixels) of the images of a video sequence, motion estimation makes it possible to encode only the form of specific blocks or, respectively, only the form of specific objects as well as further information about the blocks or, respectively, objects between two successive images and forward this to the receiver.

For example, further information can contain the shift of these blocks or, respectively, objects between two successive images.

A considerable savings in required transmission capacity is achieved with this block based or, respectively, object based coding.

Fundamentals about motion estimation given block based image coding methods can be found, for example, in the following documents:

R. Mester and M. Hötter, Zuverlässigkeit und Effizienz yon Verfahren zur Verschiebungsvektorschätzung, Musererkennung, 1995, Informatik Aktuell, Spring Verlag, pp. 285–294;

Liu et al., Method and apparatus for determining motion vectors for image sequences, U.S. Pat. No. 5,398,068, 1995;

F. Dufaux and F. Moscheni, Motion techniques for digital TV: A Review and New Contribution, Proceedings of the IEEE, vol. 83, no. 6, pp. 858–876, June 1995.

A dynamic programming method is known (H. Sakoe et al., Dynamic Programming Algorithm Optimization for Spoken Word Recognition, IEEE Transactions, Vol. ASSP-26, No. 1, pp. 43 through 49, 1978).

The employment of the dynamic programming method (dynamic programming algorithm, DP method) is also known in image processing and, in particular, in conjunction with what is referred to as stereo correspondence (D. Geiger et al., Occlusions and Binocular Stereo, Intern. Journal of Computer Vision, No. 14, Kluwer Academic Publishers, Boston, pp. 211 through 226, 1995).

One disadvantage in this proposed method can be seen therein that the cost function employed in the DP method is fashioned such that the motion vectors allocated to the picture elements are intensified in such a way that the motion vectors comprise no great differences within a uniform surface or area, that is, within an object to be classified, but, rather, such that no great discontinuities occur between the motion vectors (monotonicity constraint). Although a qualitatively good motion estimation is thereby achieved for the picture elements within the object, this method is inadequate especially for picture elements at the edges of objects since these picture elements are not classified as object edge elements or points in this method but—erroneously—as occlusions.

Another method that employs the DP algorithm for motion estimation in the framework of what is referred to as stereo correspondence is known (I. Cox et al., Stereo Without Regularization, NEC Research Institute, Princeton, N.J. 08540, pp. 1–31, 1992.

The two methods described above continue to comprise the disadvantage that the DP method is only implemented in a two-dimensional optimization space. This means that only the motion of objects in one direction is reliably recognized, for example in the direction of the investigated scan line. When, however, an object moves rapidly in another direction, then, as set forth below, it can occur that the object is no longer "found" by the DP method and, thus, faulty motion vectors are allocated to the individual picture elements by this method.

SUMMARY OF THE INVENTION

The present invention is thus based on the problem of specifying a method for motion estimation with which correct motion vectors are also allocated to the individual picture elements at object edges of the images of the video sequence.

In general terms the present invention is a method for computer-supported motion estimation fro picture elements of chronologically successive images of a video sequence. A luminance gradient is determined for each picture element of an image to be encoded. A cost function is determined for each picture element of an image to be encoded. The cost function indicates the coincidence of an area surrounding the picture element with an area of the same shape in a chronologically preceding image that is shifted compared to the area that surrounds the picture element of the image to be encoded. The cost function has at least a first term by which the value of the cost function is incremented corresponding to the differences of values located next to one another on a scan line. The cost function has at least a second term by which the value of the cost function is deincremented given an increasing luminance gradient. A dynamic programming is implemented for each picture element on the basis of the cost function. A motion vector determined by the dynamic programming is allocated to the picture element.

A cost function whose value is incremented given increasing differences of values of the motion vectors of picture elements that are located next to one another on a scan line and whose value is deincremented given increasing luminance gradients of the individual picture elements is thereby employed for every individual picture element for the DP algorithm.

What is thus achieved is that the motion estimation for the picture elements is considerably improved since the optimization is no longer globally implemented along the scan line; rather, the additional term sees to it that an optimization is implemented within the individual objects. This means that the DP method now also takes edges of objects into consideration in the optimization.

It is advantageous for the method to employ a three-dimensional optimization area, also called search area, for the DP algorithm.

These three dimensions are:

the scan line along which the motion estimation is implemented, values for motion vectors in a first direction, and values for motion vectors of a second direction that is unequal to the first direction.

This expansion of the optimization space for the DP algorithm also makes it possible to still recognize objects that are greatly shifted in a second direction differing from the first direction between two chronologically successive images and to thus be able to correctly implement the motion estimation for the individual pixels.

Misclassifications of areas as occlusions, as is inescapable in the known methods, are thus avoided.

The regularization, however, is thereby not implemented along the scan line as a whole; rather, the scan line is divided into individual segments dependent on whether an edge of an object is detected or not. When a picture element of the scan line is classified as edge element with an increased value of the luminance gradient of the respective picture element resulting therefrom, the influence of the enhanced luminance gradient of the picture element on the part of the cost function of the DP algorithm that serves for regularization is "damped". As a result thereof, the scan line is divided into segments that correspond to the individual objects that are delimited from one another by edges.

An advantageous development of the method is comprised therein that a region that comprises a rectangular or quadratic shape is employed for what is referred to as the matching of a picture element of two chronologically successive images. The luminance values of the individual picture elements that are located within this region are added, normed and compared to one another in this region surrounding the respective picture element.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Dynamic Programming

The underlying method of dynamic programming is explained in H. Sakoe et al., Dynamic Programming Optimization for Spoken Word Recognition, IEEE Transactions, Vol. ASSP-26, No. 1, pp. 43 through 49, 1978.

Transferred to image processing and specifically motion estimation, the goal of the method of dynamic programming is to determine the greatest possible coincidence of a scan line from a first image with a region of a second image in the video sequence that chronologically follows the first image and to thereby implement a motion estimate for the picture elements located on the respective scan line.

The method of dynamic programming is an optimization method that requires a priori statistical information as well as certain determination rules for the determination of an optimum solution.

A probability $P(n-1, d)$ indicates the probability that a first picture element $n-1$ on a scan line comprises a motion vector value d.

A conditional probability $P(n, d'|n-1, d)$ indicates the probability that a second picture element n comprises a further motion vector value d' under the condition that the first picture element $n-1$ comprises the motion vector value d.

The further motion vector value d' can thereby be equal or unequal to the motion vector value d.

It should be noted that the probabilities described above are valid for all picture elements and for all motion vector values allocated to the picture elements. The first picture element $n-1$ and the second picture element n are two neighboring picture elements that are located on the same scan line.

When these conditional probabilities is known for each picture element along whose course the dynamic programming method is implemented, this can be formulated as an optimization problem that can be solved by the dynamic programming method.

The determination of the conditional probabilities for the individual picture elements and their allocated motion vector values is explained below.

Figure 1:
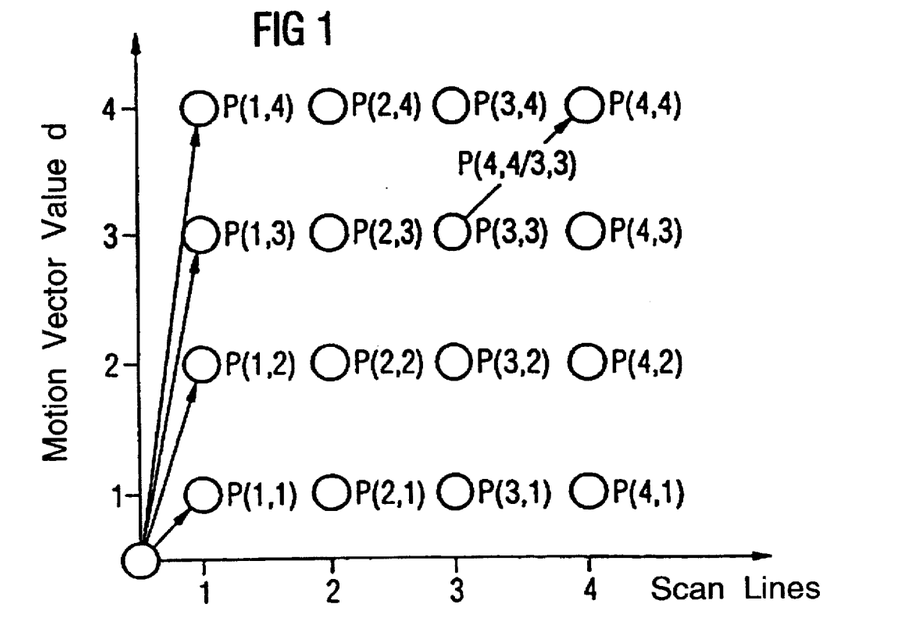
FIG. 1 is a diagram in which the DP method is described in the form of a sketch.

In FIG. 1, as a small basic example over a scan line S that comprises N picture elements, whereby the index n for designating the individual picture elements lies in the interval O . . . N, possible motion vector values d that can be allocated to the respective picture element are entered for every picture element that is located on the scan line S.

For simplification, N=4 is selected in FIG. 1, and only 4 possible motion vector values for the four individual picture elements of the scan line S are also shown.

It should be noted that this is only an extremely simple example that is merely intended to facilitate an understanding of the method of dynamic programming and that in no way limits the universal validity of the method.

The respective probability that the respective picture element n comprises the corresponding motion vector value d is also entered for every picture element in FIG. 1. For example, the probability that the picture element n=2 comprises the motion vector value d=3 is referenced $P(2, 3)$.

The respective conditional probability for the following picture element is also determined for each picture element. This probability is shown in FIG. 1 with, for example, $P(4, 4|3, 3)$, this indicating the probability of the picture element n=4 comprising the further motion vector value d'=4 under the condition that the picture element n=3 (−1) comprises the motion vector value d=3.

The determination of the conditional probability for the individual picture elements and the allocated motion vectors is explained in even greater detail below.

An evaluation C is determined from the individual probabilities and the individual conditional probabilities, this representing a criterion for the respective occurrence probability of the entire path, that is, of the combination of the individual allocation of the motion vectors to the respective picture elements.

The maximum of the evaluation C then yields the greatest coincidence of the respective picture elements of the scan line between the two chronologically successive images.

The evaluation C ensues in the following way:

$$C = \max \left( \sum_{n=0}^{N} P(n, d'|n-1, d) \cdot P(n, d') \right) \quad (1)$$

It is only necessary in the implementation of the dynamic programming method that a path must be taken into consideration from a starting point to a sought end point.

Given the example shown in FIG. 1, this means that the remaining 15 possible paths given 16 possible paths need not be taken into consideration. The maximum value of the evaluation C for a path of i vectors that end in the picture element j is respectively referenced D(i, j).

D(i, j) is recursively determined according to the following rule (specifically for the example shown in FIG. 1):

$$D(i,j) = \max[D(i-1,k) + P(j|k) \cdot P(j,i)] \, 1 \leq k \leq 4 \quad (2)$$

The respective motion vector value that is allocated to the picture element j is thereby referenced with an index k.

For a path that, for example, ends in the picture element n=3, this means, for the specific case in FIG. 1, $$D(4,3) = \max[D(3,k) + P(3|k) \cdot P(3,4)] \, 1 \leq k \leq 4 \quad (3)$$

The recursion equation (2) is now implemented for a path length of n vectors, whereby the method is topically implemented for the picture elements of the respective image from left to right under the assumption that all scan lines begin at a "$0^{th}$" picture element n=0.

In order to determine the globally best pattern, that is, in order to determine the best path, this path must also be backtracked. Required therefor is that the optimum precursor of a picture element and of the motion vector allocated to this picture element must be respectively capable of being relocated for every vector in an overall path. This is achieved in that the optimum precursor is respectively marked and stored. What is referred to as backtracking is thus achieved for determining the optimum overall allocation of the motion vector values to the picture elements of the scan line S.

The size of the value range of the motion vector values d is of critical significance for the speed with which the dynamic programming method can be implemented. This search area is usually limited by specific assumptions. An example of such limitations is the monotonicity constraint that is utilized to see to it that the motion vectors of picture elements within an object form a monotonous function. This is to be attributed to the assumption that all picture elements of an object comprise similar motion vector values since, of course, the position of the object also changes uniformly.

DP Method with Three-Dimensional Optimization Space

The problem of image processing given motion estimation by dynamic programing is then comprised therein that an object can be shifted in any arbitrary direction between two successive images.

Figure 4A:
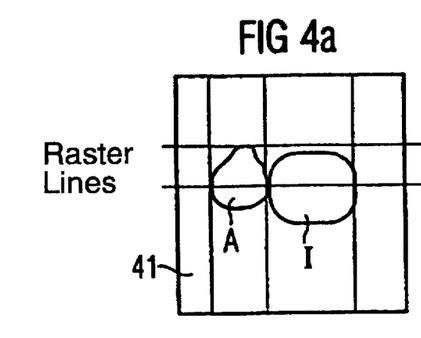
FIGS. 4a and 4b depict two chronologically successive images with two objects A and B, whereby an object A is shifted in a second direction (FIG. 4b), this illustrating the problem on which the invention is based.
Figure 4B:
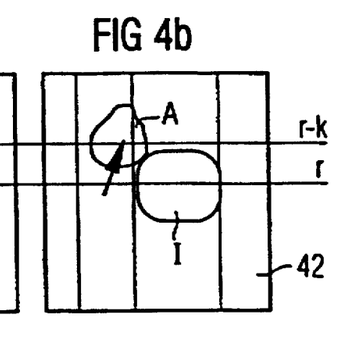

The position of an object may thus possibly also change very rapidly between two images. This problem is shown in FIGS. 4a and 4b in which a first object A is shifted both horizontally as well as vertically in a second image 42 with reference to a first image 41.

A second object B, by contrast, is not vertically shifted.

Figure 5A:
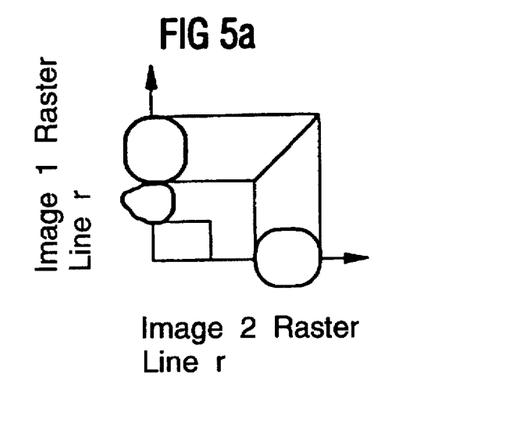
FIGS. 5a and 5b depict the result of the DP method applied to the objects A and B shown in FIG. 4, first with a known method (FIG. 5a) wherein an occlusion is determined, and a result of the DP method according to the inventive method with an additional "search direction" in the optimization space of the DP method (FIG. 5b), the incorrect classification being thereby avoided and the object A being classified in a correct way.

When a raster line r is then employed as scan line in the dynamic programming method in order to obtain a coincidence of the raster line r of the first image 41 with a region of a second image 42, a coincidence gap is determined on the basis of the vertical shift of the first object A given the known method, as shown in FIG. 5a. The respective points of coincidence, that is, the correctly classified picture elements, are described in FIG. 5a with the motion vector values allocated to them.

In the known method, no coincidence between the luminance values of the picture elements of the first image 41 and the luminance values of the picture elements of the second image 42 can be determined given the known method. For this reason, the area of these picture elements is incorrectly classified as what is referred to as an occlusion.

This vertical motion of the first object A is inventively compensated by the following procedure. The raster line r is "divided" into a plurality of segments of other raster lines.

A further raster line r–k is shown in FIG. 4b as a simple example.

Figure 5B:
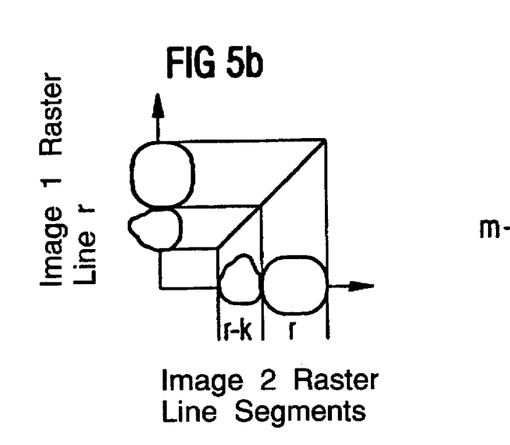

The improved result due to the plurality of segments of several raster lines is shown in FIG. 5b. The points of coincidence in FIG. 5b are in turn respectively described by the line P.

The raster line r of the first image 41 is respectively shown in FIGS. 5a and 5b. This, first, is contrasted with the raster line r of the second image 42 (FIG. 5a) or, respectively, the further raster line r–k of the second image according to the inventive method (FIG. 5b).

The vertical shift of the further raster line r–k compared to the raster line r is thereby respectively referenced with k.

The plurality of further raster lines that are respectively vertically shifted compared to the raster line r is arbitrary and application-dependent.

The optimization of the evaluation C now ensues in a three-dimensional optimization space according to the following rule:

$$C = \max \left( \sum_{n=0}^{N} P(n, d'_1, d'_2 | n-1, d_1, d_2) \cdot P(n, d'_1, d'_2) \right) \quad (4)$$

$P(n, d_1', d_2'|n-1, d_1, d_2)$ thereby indicates the probability that a picture element n on the scan line S comprises the motion vector $(d_1', d_2')$ under the condition that the neighboring picture element n−1 comprises the motion vector $(d_1, d_2)$. $P(n, {}_1d'{,}_2d')$ indicates the probability that the picture element n comprises the motion vector $(d_1', d_2')$.

The procedure is inventively realized in that the optimization space employed for the dynamic programming method is expanded by another dimension.

This further dimension of the optimization space is likewise taken into consideration in the determination of the respective cost function $T_n(d_1, d_2)$ for the individual picture elements n. This means that two values are assigned to a picture element n along a raster line, a first motion vector value $d_1$ for a first direction and a second motion vector value $d_2$ for a second direction.

The regularization, however, is thereby not implemented along the scan line as a whole; rather, the scan line is divided into individual segments dependent on whether an edge of object is detected or not. When a picture element of the scan line is classified as edge element with an increased value of the luminance gradient of the respective picture element resulting therefrom, the influence of the boosted luminance gradient of the picture element on the part of the cost function of the DP algorithm that serves for regularization is "damped". As a result thereof, the scan line is divided into segments that correspond to the individual objects that are delimited from one another by edges.

What is thus achieved is that the regularization (monotonicity constraint) only occurs within each object and classification errors at object edges are thus avoided.

Cost Functions

When the individual probabilities and the individual conditional probabilities for the respective picture elements $s_p$ and the motion vectors $(d_1, d_2)$ possibly allocated to the picture elements $s_p$ are not yet known, then they can be calculated, for example, in the following way.

The cost function $T_n(d_1, d_2)$, which corresponds on principle to the conditional probability that was described above, is determined according to the following rule for each picture element $s_p$ for every possible shift, i.e. for all possible first motion vector values $d_1$ and all possible second motion vector values $d_2$:

$$T_n(d_1,d_2) = NMC_n(d_1,d_2) = \frac{c}{N} \sqrt{\sum_{l=n-T}^{n+T} \sum_{j=m-\lambda}^{m+\lambda} (W_{F1}(i,j) - W_{F2}(i+d_1 j + d_2))^2} \quad (5)$$

whereby n, m describe coordinate values of individual picture elements $s_p$, $d_1$ describes the respectively assumed first motion vector value, $d_2$ describes the respectively assumed second motion vector value, $(d_1, d_2)$ describes a respectively assumed motion vector, $2\tau+1$ indicates the size of the region in the first direction in picture elements, $2\lambda+1$ indicates the size of the region in the second direction in picture elements, $N=(2\tau+2\lambda-1)*3$ indicates a plurality of the picture elements located in the region, c describes a normalization constant, $W_{F1}(i,j)$ describes a luminance value of the image to be coded at the location (i,j), and $W_{F2}(i,j)$ describes a luminance value of the chronologically preceding images at the location (i,j).

This procedure of determining the coincidence of a picture element $s_p$ of the first image with a picture element of the second image is called block matching.

It was hitherto customary to implement the block matching in only one direction, this having led to the following "traditional" cost function:

$$T_n(d) = NMC_n(d) = \frac{c}{N} \sqrt{\sum_{i=n-T}^{n+T} \sum_{j=m-\lambda}^{j=m-\lambda} (W_{F1}(i,j) - W_{F2}(i+dj))^2}$$

The symbol d thereby references a motion vector value in the one investigated "shift direction" of the respective picture element.

This "traditional" cost function is expanded by an additional summand by the inventive method.

This expansion provides two aspects:

1. The motion vectors allocated to the picture elements are intensified in a way that the motion vectors exhibit no great differences within a uniform area, that is, within an object to be classified, rather that no great discontinuities occur between the motion vectors (monotonicity constraint).

This procedure is known (D. Geiger et al., Occlusions and Binocular Stereo, Intern. Journal of Computer Vision, No. 14, Kluwer Academic Publishers, Boston, pages 211 through 226, 1995).

2. The value of the cost function is lowered for picture elements at object edges so that a change of objects in the classification is enabled.

This is possible since a greater change of motion vector values of neighboring picture elements that, however, "belong" to different objects is now "punished" by high values in the cost function to the same extent as given picture elements that are located within an object and thus exhibit less of a luminance gradient than picture elements that are located at object edges.

Different functions that take this consideration into account can be employed in the inventive method.

Figure 2:
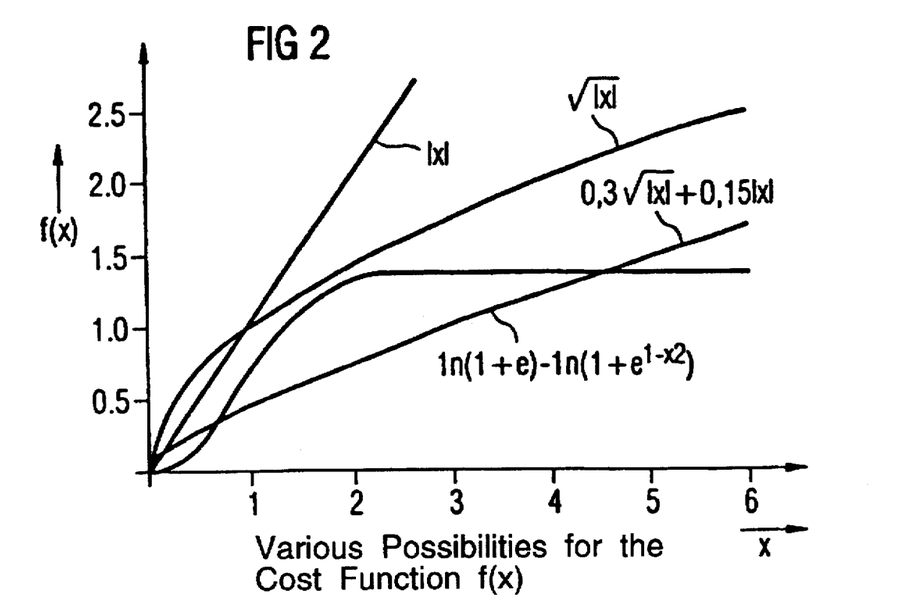
FIG. 2 is an illustration of a plurality of functions that can be employed in the framework of additional smmmands for the cost functions described below.

Different functions are known for the first aspect (see 1.) and their properties with respect to the specific demands have been investigated in D. Geiger et al., Occlusions and Binocular Stereo, Intern. Journal of Computer Vision, No. 14, Kluwer Academic Publishers, Boston, pages 211 through 226, 1995. Possible functions are also shown in FIG. 2.

An advantageous expression of the function for the first aspect derives in the following way:

$$f(x) = \mu \sqrt{|x|} + \epsilon |x|.$$

Then deriving for the developments of the method in which a three-dimensional search area is introduced in the DP method is:

$$f(x_2) = \mu \sqrt{|x_2|} + \epsilon |x_2|, x_2 \geq 0, \quad (6)$$

$$f(x_1) = \mu \sqrt{|x_1|} + \epsilon |x_1|, x_1 \geq 0, \quad (6)$$

and/or $$f(x_2) = \mu \sqrt{|x_2|} + \epsilon |x_2|, x_2 \geq 0, \quad (6)$$

whereby $x_1$, $x_2$ describes a differential quantity of the motion vector values for the first direction $d_1$ or, respectively, for the second direction $d_2$ of two neighboring picture elements along of the scan line S, $\mu, \epsilon$ describe two empirically determined constants.

The two empirically determined constants $\mu$ and $\epsilon$ preferably have the values $\mu=0.3$ and $\epsilon=0.15$.

What is achieved by these further summands is that the motion vectors of picture elements within an object form a monotonous function (monotonicity constraint).

The second aspect of considering object edges described above that is achieved by the inventive method is achieved by a function that controls the influence of f(x) or, respectively, $f(x_1, x_2)$ on the cost function dependent on the luminance gradient of the respective picture element. This ensues in a way that the value of the function f(x) or, respectively, $f(x_1, x_2)$ is attenuated, i.e. lowered, with increasing luminance gradient.

The cost function for each picture element thus derives in the following way:

$T_n(d) = NMC_n + f(x,s)$.

An example of what structure this function then exhibits is described below. This example, however, is not to be construed as limiting in any way whatsoever but is intended to convey an impression of what property the function must exhibit. It is of significance neither that an exponential function is introduced in the specific case bor that the normed luminance gradient is squared. Any function that likewise increases with increasing luminance gradient can be employed in the inventive method.

It has proven advantageous to employ the following function as additional summand for the cost function:

$$f(x,s) = \frac{(\mu \sqrt{|x|} + \epsilon|x|)}{e^{\beta s^2}}.$$

$$f(x_1,s) = \frac{(\mu \sqrt{|x_1|} + \epsilon|x_1|)}{e^{\beta s^2}}, x_1 \geq 0, s \geq 0, \quad (7)$$

and/or $$f(x_2,s) = \frac{(\mu \sqrt{|x_2|} + \epsilon|x_2|)}{e^{\beta s^2}}, x_2 \geq 0, s \geq 0, \quad (7)$$

then derives in case a three-dimensional optimization space is utilized,
whereby $x_1$, $x_2$ again describes a differential quantity of the motion vector values for the first direction $d_1$ or, respectively, for the second direction $d_2$ of two neighboring picture elements along the scan line S, $\mu$, $\epsilon$ again describe the two empirically determined constants, $\beta$ describes a gradient intensification constant, and s indicates a normalized luminance gradient for the respective picture element.

Due to the denominator $e^{\beta s^2}$ of this additional summand, the influence of the monotony function $$\mu \sqrt{|x_1| + \epsilon|x_1|}$$

and/or $$\mu \sqrt{|x_2| + \epsilon|x_2|}$$

on the cost function $T_n(d_1, d_2)$ is made dependent on the change in the luminance of the respective picture element, and what is thus achieved is that the influence of the monotony function on the cost function $T_n(d_1, d_2)$ is great within objects but only slight at the object edges.

The influence of the monotony function $$\mu \sqrt{|x_1| + \epsilon|x_1|}$$

and/or $$\mu \sqrt{|x_2| + \epsilon|x_2|}$$

on the cost function $T_n(d_1, d_2)$ is thus reduced at the object edges, as a result whereof the dynamic programming method mainly employs the first summand $NMC_n(d_1, d_2)$ of the cost function $T_n(d_1, d_2)$ as optimization criterion in this region in this case.

Since the employment of Equation (5) usually comprises better results in the proximity of object edges than within an object, the dependability of the cost function $T_n(d_1, d_2)$ is enhanced at the object edges and, as a result, a correct classification for the respective picture element and of the motion vector $(d_1, d_2)$ allocated to this picture element is achieved without influence of the monotony function.

A typical problem in this field of application lies in the regions in which great changes of motion vectors appear between two successive picture elements along the raster line r due to rapid movement (great shift) of an object.

If the edges of the respective object were not taken into consideration and only Equation (6) were considered as additional summand in the cost function, the overall costs for the respective picture element in the framework of the DP method would become extremely high for the assumed motion vector at the object edges and these high costs would lead thereto that a region with great movement would be interpreted as what is referred to as occlusion.

Any desired type of gradient filter at the command of a person skilled in the art can be employed for determining the normalized luminance gradient for the respective picture element.

The employment of the Sobel operator, however, shall be shown in this exemplary embodiment. The luminance gradient for a direction K can be determined by the following convolution relationship:

$$G_K(n,m) = F(n,m) \otimes H_K(n,m) \quad (8)$$

$H_K(n,m)$ thereby indicates a 3×3 pulse response matrix that is employed for determining the respective luminance gradient in the four directions, vertical direction V, horizontal direction H, a direction L inclined 45° toward the left from the perpendicular, as well as a direction R inclined 45° toward the right from the perpendicular. The individual matrices of the pulse responses of the Sobel operator are set forth below.

Pulse response matrix $H_H$ for the horizontal direction H:

$$H_H = \frac{1}{4} \begin{bmatrix} 1 & 0 & -1 \\ 2 & 0 & -2 \\ 1 & 0 & -1 \end{bmatrix}.$$

Pulse response matrix $H_V$ for the vertical direction V:

$$H_V = \frac{1}{4} \begin{bmatrix} -1 & -2 & -1 \\ 0 & 0 & 0 \\ 1 & 2 & 1 \end{bmatrix}.$$

Pulse response matrix $H_L$ for the direction L inclined 45° toward the left from the perpendicular:

$$H_L = \frac{1}{4} \begin{bmatrix} -2 & -1 & 0 \\ -1 & 0 & 1 \\ 0 & 1 & 2 \end{bmatrix}.$$

Pulse response matrix $H_R$ for the direction R that is inclined 45° toward the right from the perpendicular:

$$H_R = \frac{1}{4} \begin{bmatrix} 0 & -1 & -2 \\ 1 & 0 & -1 \\ 2 & 2 & 0 \end{bmatrix}.$$

F(n,m) is the region of the image that is convoluted with the Sobel operator. A gradient $G_K(n, m)$ for the respective picture element (n,m) is determined for each direction K∈[H, V, R, L].

The maximum value $G_{max}(n,m)$ of the four identified gradients is employed as the gradient of the edge for the respective picture element (n,m):

$$G_{max}(n,m) = \max(G_H(n,m), G_V(n,m), G_L(n,m), G_R(n,m)) \quad (9)$$

This means that the normalized luminance gradient s derives in the following way:

$$s = \frac{G_{max}(n,m)}{\omega} \quad (10)$$

ω thereby indicates a normalization constant.

Figure 3:
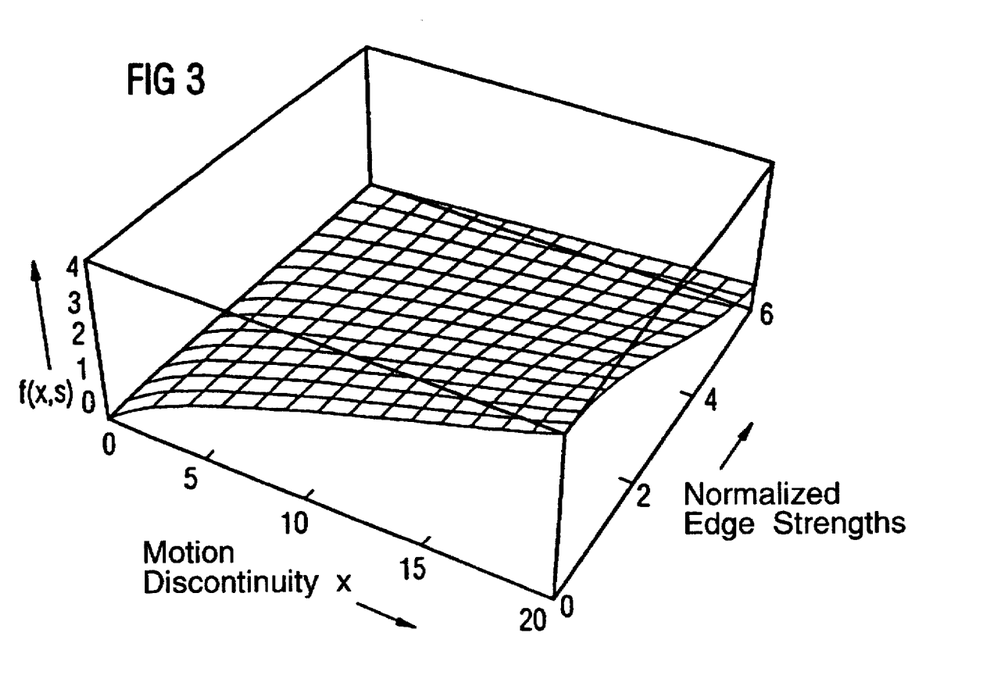
FIG. 3 is an illustration of a function that is especially suitable as additional summand in the cost function.

FIG. 3 shows the additional summand in the form of a two-dimensional function f(x,s):
This function can be divided into two different areas:

$$0 \leq s \leq 1: e^{\beta s^2} \approx 1 \rightarrow f(x,s) = \mu \sqrt{|x|} + \epsilon|x| \quad x \leq 0 \quad (11)$$

For 0<s<1, Equation (11) denotes that the additional summand only "punishes" great changes of motion vectors for that case wherein no object edge could be determined or wherein only an extremely slight luminance gradient s could be identified and thus sees to it that the motion vectors that are allocated to picture elements within an object yield a monotonous function.

The second region for s≥1 describes the areas wherein a pronounced edge was identified. The influence of this function on the cost function is thus reduced in order to "allow" a discontinuity of the motion vectors of neighboring picture elements.

Thus deriving for the second region s≥1:

$$s \geq 1: e^{\beta s^2} > 1 \rightarrow f(x,s) = \frac{(\mu \sqrt{|x|} + \epsilon|x|)}{e^{\beta s^2}} \quad x \geq 0 \quad (12)$$

An overall cost function $Tg_n(d_1, d_2)$ is now determined on the basis of the individual picture elements according to the following recursive rule:

$$Tg_n(d_1,d_2) = NMC_n(d_1,d_2) + f(x_1,s) + f(x_2,s) + Tg_{n-1}(d_{1_{best}},d_{2_{best}}) \quad n > 1 \quad (13)$$

$$Tg_n(d_1,d_2) = NMC_n(d_1,d_2) \quad n = 1 \quad (13)$$

The term $Tg_{n-1}(d_{1_{best}}, d_{2_{best}})$ thereby respectively references the best allocation of a motion vector $(d_{1_{best}}, d_{2_{best}})$ for a preceding picture element n−1.

This corresponds to the fundamental procedure with the above-described conditional probability in the framework of the DP method, with the difference that it is not the maximum evaluation C that is sought, which corresponds to a maximum occurrence probability, but, rather, a minimum of the overall cost function $T_n(d_1,d_2)$ is determined in this case in order to minimize the overall costs.

As a result thereof, an optimum allocation of the motion vectors to the individual picture elements that are located on the respective scan line S is achieved.

The region that is used for calculating the cost function for the respective picture element can basically be shaped in an arbitrary way.

Figure 6A:
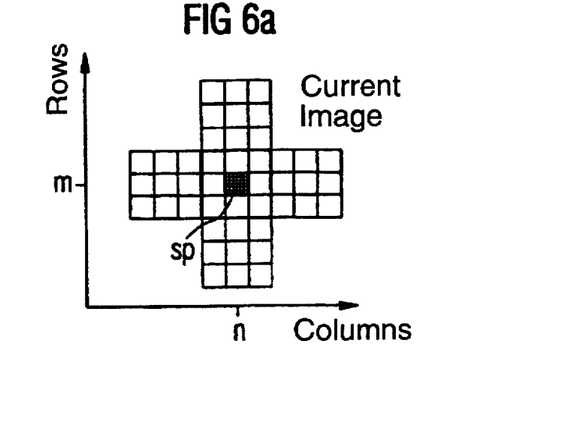
FIGS. 6a and 6b depict a region that surrounds the respective pixel under investigation in a first image (FIG. 6a) and in an image chronologically following the first image, a motion vector (d1, d2) describing the assumed shifts of the picture element from FIG. 6a with respect to the first direction and the second direction (FIG. 6b)
Figure 6B:
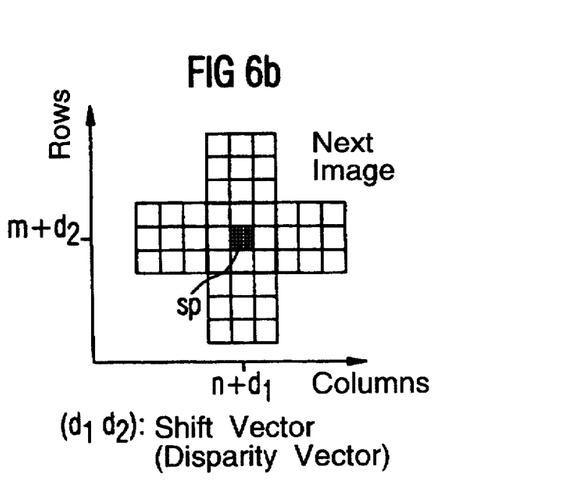

However, it is advantageous when the region comprises a quadratic shape or a shape as shown in FIG. 6.

Given this region shown in FIG. 6, the advantage of the shape of the region is to be seen therein that, due to the shape, the coincidence results in the proximity of edges comprise an improved reliability than given many other shapes of the region to be employed.

This shape of the region is advantageously selected in order to achieve better results in the motion estimation in two pronounced directions that reside approximately perpendicular to one another. For this reason, the region has the shape of a cross in this specific exemplary embodiment.

This, however, does not limit the general employability of arbitrary shapes of the region in any way whatsoever.

The luminance difference for every possible shift is formed in the three-dimensional search area, this difference being also normalized by dividing the result by the plurality of picture elements N situated in the area.

This fundamentally corresponds to the probability that a picture element $s_p$ of the first image respectively corresponds to the picture element in of the second image shifted by the corresponding, first motion vector value and the corresponding, second motion vector value (see FIG. 6).

When the cost function for the respective picture element comprises the value of zero, this means that there is complete coincidence between the luminance values of the two regions of the first image or, respectively, second image. When the cost function comprises the value of one, this means a complete non-coincidence of the luminance values between the region in the first image and the region of the second image shifted by the corresponding motion vector values.

The sole difference of the identified cost function $T_n(d_1, d_2)$ can be seen therein, namely that all the higher probability derives in the case of the cost function for a lower value. This, however, need not be separately taken into consideration in the method, [but] only to the extent that the optimization in the DP method happens to be implemented according to a minimal cost function.

FIG. 6a shows a picture element $s_p$ with the picture element coordinates n, m and the area within which the cost function $T_n(d_1, d_2)$ is formed for the picture element $s_p$.

FIG. 6b shows the area shifted by the motion vector $(d_1, d_2)$. This means that the coincidence of the picture element $s_p$ of the first image with a further picture element $s_p'$ of the second image that was shifted in the second image compared to the first image and the motion vector $(d_1, d_2)$ is investigated.

Figure 7:
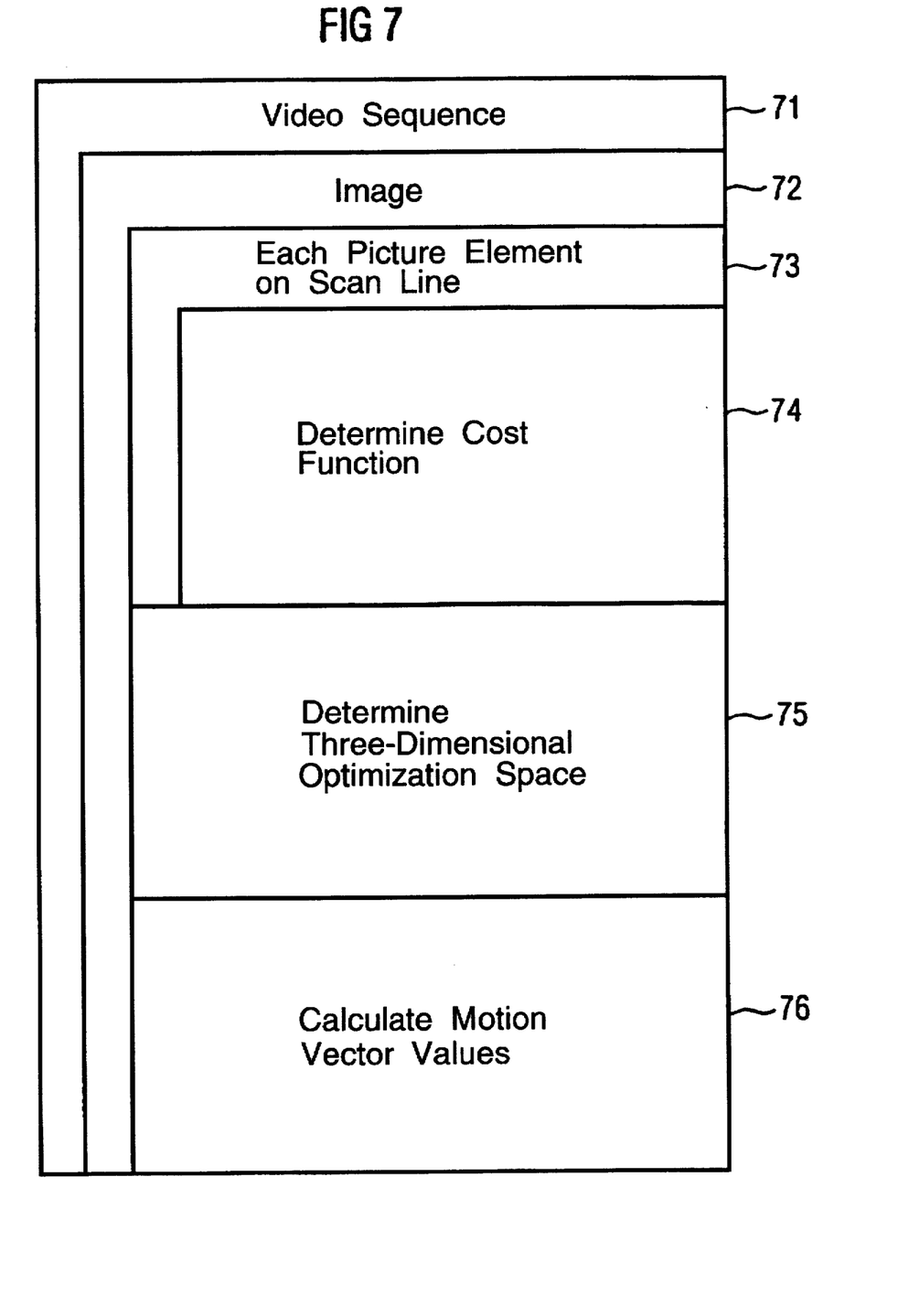
FIG. 7 is a flowchart in which individual method steps of the inventive method are shown.

FIG. 7 shows the method in the form of a flowchart.

In a first step, the following methods steps for each scan line S of the image 72 are iteratively implemented for each image of a video sequence 71.

The cost function $T_n(d_1,d_2)$ is determined 74 for each picture element that is located 73 on the scan line S, either with or without additional summand, as was described above.

A DP method is implemented for the picture elements of a scan line S, whereby an overall path is determined with a three-dimensional optimization space on the basis of a minimum overall cost function $Tg_n(d_1,d_2)$, as was described above 75.

In a last step 76, the motion vector values calculated by the DP method are allocated to the picture elements of the scan line S.

After the motion estimate has been implemented, the picture elements can also be classified to objects and a motion vector can be allocated to the objects. The procedure is thereby familiar to anyone skilled in the art.

Taking the individual objects and the motion vectors into consideration, the images are then channel-coded to a video data stream and transmitted via a channel to a receiver, where the video data stream is in turn decoded and the image reconstructed. These procedures are also notoriously known to a person skilled in the art.

The inventive method is a method of image processing and is necessarily implemented by at least one computer.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for computer-supported motion estimation for picture elements of chronologically successive images of a video sequence, comprising the steps of:

determining a luminance gradient for each picture element of an image to be encoded;

determining a cost function for each picture element of the image to be encoded, said cost function indicating coincidence of an area surrounding a respective picture element with an area of a same shape in a chronologically preceding image that is shifted compared to the area that surrounds the picture element of the image to be encoded;

the cost function having at least a first term by which a value of the cost function is incremented corresponding to differences of values of motion vectors of picture elements that are located next to one another on a scan line of the respective picture element;

the cost function having at least a second term by which the value of the cost function is deincremented given an increasing luminance gradient of the respective picture element;

implementing a dynamic programming for each picture element based on the cost function thereof; and allocating a motion vector, determined by dynamic programming, to the respective picture element.

2. The method according to claim 1, wherein the area extends over a plurality of picture elements in at least one of a first direction and a second direction.

3. The method according to claim 1, wherein the area is a quadratic shape.

4. The method according to claim 1, wherein the cost function derives from:

$$T_n(d) = NMC_{n,m}(d) + \frac{(\mu \sqrt{|x|} + \epsilon |x|)}{e^{\beta s^2}}$$

with $$NMC_n(d) = \frac{c}{N} \sqrt{\sum_{i=n-T}^{n+T} \sum_{j=m-\lambda}^{j=m-\lambda} (W_{F1}(i,j) - W_{F2}(i+d,j))^2}$$

where n, m describe coordinate values of individual picture elements $s_p$, d describes a respectively assumed motion vector value, $2\tau+1$ indicates a size of a region in a first direction in picture elements, $2\lambda+1$ indicates a size of a region in a second direction in picture elements, $N=(2\tau+2\lambda-1)*3$ indicates a plurality of picture elements located in a region, c describes a normalization constant, $W_{F1}(i,j)$ describes a luminance value of the image to be coded at location (i,j), $W_{F2}(i,j)$ describes a luminance value of chronologically preceding images at the location (i,j), x describes a difference quantity of the motion vector values in a direction of two neighboring picture elements along the scan line, $\mu, \epsilon$ describe two empirically determined constants, $\beta$ describes a gradient amplification constant, and s indicates a normalized luminance gradient for the respective picture element.

5. The method according to claim 1, wherein at least the following three search areas are employed for the dynamic programming:

a scan line along which the motion estimation is implemented;

first motion vector values for the respective picture element for a first direction;

second motion vector values for the respective picture element for a second direction; and wherein a first motion vector determined by the dynamic programming and a second motion vector determined by the dynamic programming are allocated to the respective picture element.

6. The method according to claim 1, wherein the cost function $T_n(d_1,d_2)$ derives from:

$$T_n(d_1,d_2) = NMC_{n,m}(d_1,d_2) + f(x,s)$$

with $$NMC_n(d_1,d_2) = \frac{c}{N} \sqrt{\sum_{i=n-T}^{n+T} \sum_{j=m-\lambda}^{j=m-\lambda} (W_{F1}(i,j) - W_{F2}(i+d_1,j+d_2))^2}$$

and $$f(x,s) = f(x_1,s) = \frac{(\mu \sqrt{|x_1|} + \epsilon |x_1|)}{e^{\beta s^2}}, \quad x_1 \geq 0, s \geq 0,$$

or $$f(x,s) = f(x_2,s) = \frac{(\mu \sqrt{|x_2|} + \epsilon |x_2|)}{e^{\beta s^2}}, \quad x_2 \geq 0, s \geq 0,$$

or $$f(x,s) = f(x_1,s) + f(x_2,s)$$

whereby n,m describe coordinate values of individual picture elements $s_p$, $d_1$ describes a respectively assumed first motion vector value, $d_2$ describes a respectively assumed second motion vector value, $(d_1,d_2)$ describes a respectively assumed motion vector, $2\tau+1$ indicates a size of a region in a first direction in picture elements, $2\lambda+1$ indicates a size of a region in a second direction in picture elements, $N=(2\tau+2\lambda-1)*3$ indicates a plurality of picture elements located in a region, c describes a normalization constant, $W_{F1}(i, j)$ describes a luminance value of the image to be coded at location (i,j), $W_{F2}(i,j)$ describes a luminance value of a chronologically preceding images at the location (i,j), x describes a difference quantity of the motion vector values in a direction of two neighboring picture elements along a scan line, $\mu, \epsilon$ describe two empirically determined constants, β describes a gradient amplification constant, and s indicates a normalized luminance gradient for the respective picture element.

7. The method according to claim 1, wherein a Sobel filter is employed for forming the normalized luminance gradient.

8. The method according to claim 1, wherein the area is a rectangle.

9. A method for computer-supported motion estimation for picture elements of chronologically successive images of a video sequence, comprising the steps of:

determining a luminance gradient for each picture element of an image to be encoded;

determining a cost function for each picture element of the image to be encoded, said cost function indicating coincidence of an area surrounding a respective picture element with an area of a same shape in a chronologically preceding image that is shifted compared to the area that surrounds the picture element of the image to be encoded, the area extending over a plurality of picture elements in at least one of a first direction and a second direction;

the cost function having at least a first term by which a value of the cost function is incremented corresponding to differences of values of motion vectors of picture elements that are located next to one another on a scan line of the respective picture element;

the cost function having at least a second term by which the value of the cost function is deincremented given an increasing luminance gradient of the respective picture element;

implementing a dynamic programming for each picture element based on the cost function thereof; and allocating a motion vector, determined by dynamic programming, to the respective picture element.

10. The method according to claim 9, wherein the area is a quadratic shape.

11. The method according to claim 9, wherein the cost function derives from:

$$T_n(d) = NMC_{n,m}(d) + \frac{(\mu \sqrt{|x|} + \epsilon |x|)}{e^{\beta s^2}}$$

with $$NMC_n(d) = \frac{c}{N} \sqrt{\sum_{i=n-T}^{n+T} \sum_{j=m-\lambda}^{j=m-\lambda} (W_{F1}(i,j) - W_{F2}(i+d,j))^2}$$

where n, m describe coordinate values of individual picture elements $s_p$, d describes a respectively assumed motion vector value, 2τ+1 indicates a size of a region in a first direction in picture elements, 2λ+1 indicates a size of a region in a second direction in picture elements, N=(2τ+2λ−1)*3 indicates a plurality of picture elements located in a region, c describes a normalization constant, $W_{F1}(i,j)$ describes a luminance value of the image to be coded at location (i,j), $W_{F2}(i,j)$ describes a luminance value of chronologically preceding images at the location (i,j), x describes a difference quantity of the motion vector values in a direction of two neighboring picture elements along the scan line, μ,ε describe two empirically determined constants, β describes a gradient amplification constant, and s indicates a normalized luminance gradient for the respective picture element.

12. The method according to claim 9, wherein at least the following three search areas are employed for the dynamic programing:

a scan line along which the motion estimation is implemented;

first motion vector values for the respective picture element for a first direction;

second motion vector values for the respective picture element for a second direction; and wherein a first motion vector determined by the dynamic programing and a second motion vector determined by the dynamic programing are allocated to the respective picture element.

13. The method according to claim 9, wherein the cost function $T_n(d_1,d_2)$ derives from:

$$T_n(d_1,d_2) = NMC_{n,m}(d_1,d_2) + f(x,s)$$

with $$NMC_n(d_1,d_2) = \frac{c}{N} \sqrt{\sum_{i=n-T}^{n+T} \sum_{j=m-\lambda}^{j=m-\lambda} (W_{F1}(i,j) - W_{F2}(i+d_1,j+d_2))^2}$$

and $$f(x,s) = f(x_1,s) = \frac{(\mu \sqrt{|x_1|} + \epsilon |x_1|)}{e^{\beta s^2}}, x_1 \geq 0, s \geq 0,$$

or $$f(x,s) = f(x_2,s) = \frac{(\mu \sqrt{|x_2|} + \epsilon |x_2|)}{e^{\beta s^2}}, x_2 \geq 0, s \geq 0,$$

or $$f(x,s) = f(x_1,s) + f(x_2,s)$$

whereby n, m describe coordinate values of individual picture elements $s_p$, $d_1$ describes a respectively assumed first motion vector value, $d_2$ describes a respectively assumed second motion vector value, $(d_1,d_2)$ describes a respectively assumed motion vector, 2τ+1 indicates a size of a region in a first direction in picture elements, 2λ+1 indicates a size of a region in a second direction in picture elements, N=(2τ+2λ−1)*3 indicates a plurality of picture elements located in a region, c describes a normalization constant, $W_{F1}(i,j)$ describes a luminance value of the image to be coded at location (i,j), $W_{F2}(i,j)$ describes a luminance value of a chronologically preceding images at the location (i,j), x describes a difference quantity of the motion vector values in a direction of two neighboring picture elements along a scan line, μ,ε describe two empirically determined constants, β describes a gradient amplification constant, and s indicates a normalized luminance gradient for the respective picture element.

14. The method according to claim 9, wherein a Sobel filter is employed for forming the normalized luminance gradient.

15. The method according to claim 9, wherein the area is a rectangle.

16. A method for computer-supported motion estimation for picture elements of chronologically successive images of a video sequence, comprising the steps of:

determining a luminance gradient for each picture element of an image to be encoded;

determining a cost function for each picture element of the image to be encoded, said cost function indicating coincidence of an area surrounding a respective picture element with an area of a same shape in a chronologically preceding image that is shifted compared to the area that surrounds the picture element of the image to be encoded;

the cost function having at least a first term by which a value of the cost function is incremented corresponding to differences of values of motion vectors of picture elements that are located next to one another on a scan line of the respective picture element;

the cost function having at least a second term by which the value of the cost function is deincremented given an increasing luminance gradient of the respective picture element;

implementing a dynamic programming for each picture element based on the cost function thereof;

allocating a motion vector, determined by dynamic programming, to the respective picture element; and at least three search areas being used by the dynamic programming, the three search areas being a scan line along which the motion estimation is implemented, first motion vector values for the respective picture element for a first direction, and second motion vector values for the respective picture element for a second direction;

wherein a first motion vector determined by the dynamic programming and a second motion vector determined by the dynamic programming are allocated to the respective picture element.

17. The method according to claim 16, wherein the cost function $T_n(d_1,d_2)$ derives from:

$$T_n(d_1,d_2) = NMC_{n,m}(d_1,d_2) + f(x,s)$$

with $$NMC_n(d_1,d_2) = \frac{c}{N}\sqrt{\sum_{i=n-T}^{n+T}\sum_{j=m-\lambda}^{j=m-\lambda}(W_{F1}(i,j) - W_{F2}(i+d_1,j+d_2))^2}$$

and $$f(x,s) = f(x_1,s) = \frac{(\mu\sqrt{|x_1|} + \epsilon|x_1|)}{e\beta s^2}, \quad x_1 \geq 0, s \geq 0,$$

or $$f(x,s) = f(x_2,s) = \frac{(\mu\sqrt{|x_2|} + \epsilon|x_2|)}{e\beta s^2}, \quad x_2 \geq 0, s \geq 0,$$

or $$f(x,s) = f(x_1,s) + f(x_2,s)$$

whereby n, m describe coordinate values of individual picture elements $s_p$, $d_1$ describes a respectively assumed first motion vector value, $d_2$ describes a respectively assumed second motion vector value, $(d_1,d_2)$ describes a respectively assumed motion vector, $2\tau+1$ indicates a size of a region in a first direction in picture elements, $2\lambda+1$ indicates a size of a region in a second direction in picture elements, $N=(2\tau+2\lambda-1)*3$ indicates a plurality of picture elements located in a region, c describes a normalization constant, $W_{F1}(i,j)$ describes a luminance value of the image to be coded at location (i,j), $W_{F2}(i,j)$ describes a luminance value of a chronologically preceding images at the location (i,j), x describes a difference quantity of the motion vector values in a direction of two neighboring picture elements along a scan line, $\mu,\epsilon$ describe two empirically determined constants, β describes a gradient amplification constant, and s indicates a normalized luminance gradient for the respective picture element.

18. The method according to claim 16, wherein a Sobel filter is employed for forming the normalized luminance gradient.

19. The method according to claim 16, wherein the area extends over a plurality of picture elements in at least one of a first direction and a second direction.

20. The method according to claim 16, wherein the area is a rectangle.

* * * * *